W. O. STODDARD.
APPARATUS FOR DESICCATING EGGS.
No. 184,186. Patented Nov. 7, 1876.
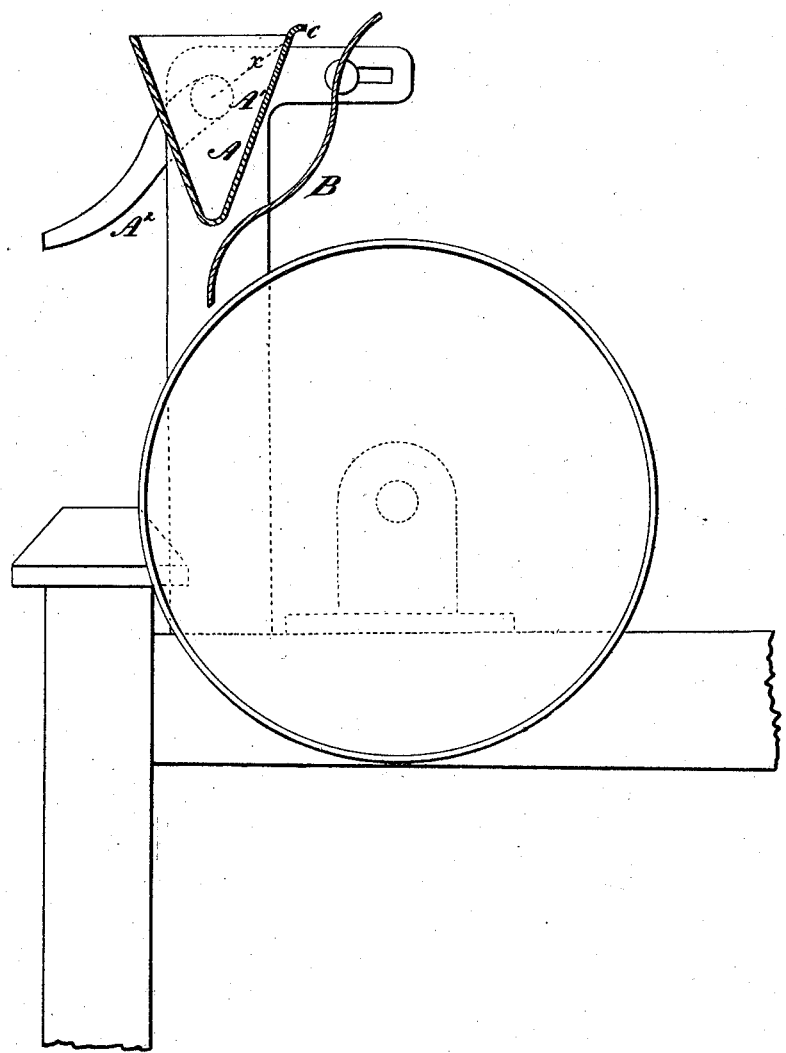

UNITED STATES PATENT OFFICE.

WILLIAM O. STODDARD, OF NEW YORK, N. Y., ASSIGNOR TO AMERICAN EGG COMPANY, OF SAME PLACE.

IMPROVEMENT IN APPARATUS FOR DESICCATING EGGS.

Specification forming part of Letters Patent No. 184,186, dated November 7, 1876; application filed March 31, 1876.

*To all whom it may concern:*

Be it known that I, WILLIAM O. STODDARD, of the city of New York, in the county of New York and State of New York, have invented a certain new and useful Improvement in Machinery Used for the Desiccation of Eggs or similar material; and I do hereby declare the following to be a full, clear, and exact description of the invention, such as will enable others skilled in the art to which it pertains to make and use it, reference being had to the accompanying drawings, which form part of this specification, in which is shown a vertical transverse section of a trough, apron, and cylinder combined for conjoint use.

In pouring or discharging albumen of eggs, yolk of eggs, batter of eggs, or other analogous material, for the purposes of desiccation or other manufacture, upon the surface of a rotating cylinder or equivalent device, it is desirable to deliver such material in an approximately even and unbroken sheet. Without such evenness of delivery, it is impossible to obtain regularity and rapidity in the processes of manufacture indicated, or uniformity in the product thereof. Experience has shown that such evenness of delivery of such material cannot be obtained in the use of a longitudinal slot, valve, or faucet, owing to the viscid and adhesive nature of the material, and its consequent tendency to rope or break into several streams. Similar difficulties, with other features equally objectionable, are found to attend any description of hand-pouring.

The object of my invention, therefore, is to deliver such material, for the purposes of manufacture, as indicated, in an even, unbroken sheet, in a manner easily controlled and regulated, without waste or spattering, and with the least possible cost of machinery and appliances. For this purpose I employ a longitudinal swinging vat or trough, as A, adapted in shape and size to the cylinder or other device with which it is to be used, and hung on journals, as $A^1$, at points above the center of gravity of such vat or trough when full. This vat or trough may be constructed of any suitable material—as, for instance, of galvanized sheet-iron—and may be supplied with the batter of eggs, or other substance to be desiccated or manufactured, by means of a pipe or other convenient method. The vat or trough is provided with an extended arm or lever, $A^2$, for convenience in tipping it to discharge its contents.

In combination with the swinging vat or trough, I employ a stationary curved apron, B, constructed of any suitable material, so fixed in position that its lower edge or discharging-lip, which should generally be vertical, is but slightly raised above the surface upon which the material from the vat or trough is to be discharged. The curve of this apron is obtained and described by a radius formed of the line drawn from the journal $A^1$ of the vat or trough A through the pouring-lip $c$ of such vat or trough, extending said line moderately beyond said lip—say, for an inch or two. It will be seen that by this means, when the vat or trough is tipped for pouring, the discharging-lip $c$ is continually close to the face of the curved apron B, no opportunity being given for roping or uneven distribution, and the material flows steadily down over the apron, and is evenly delivered upon the surface below.

I have now used twelve such sets of vats and aprons, of large size, for several weeks in practical manufacture, thoroughly testing their availability and value for the purposes indicated.

What I claim as my invention, and desire to secure by Letters Patent, is—

1. The stationary double-curved apron B, having a concavity to receive the flow of material from the trough, and a vertical extension of its lower edge, to convey the material in an even sheet to the desiccating-cylinder.

2. For the purpose indicated, and substantially as described, the combination of a swinging vat or trough, A, and a stationary curved apron, B.

In testimony that I claim the foregoing I have hereunto set my hand this 22d day of March, 1876.

WILLIAM O. STODDARD.

Witnesses:
LUCIEN BIRDSEYE,
BENJ. H. BAYLISS.